June 22, 1965      C. M. MacCHESNEY      3,190,138
MOTION TRANSMITTING MECHANISMS OF THE GEAR-PINION TYPE
Filed March 4, 1963      2 Sheets-Sheet 1
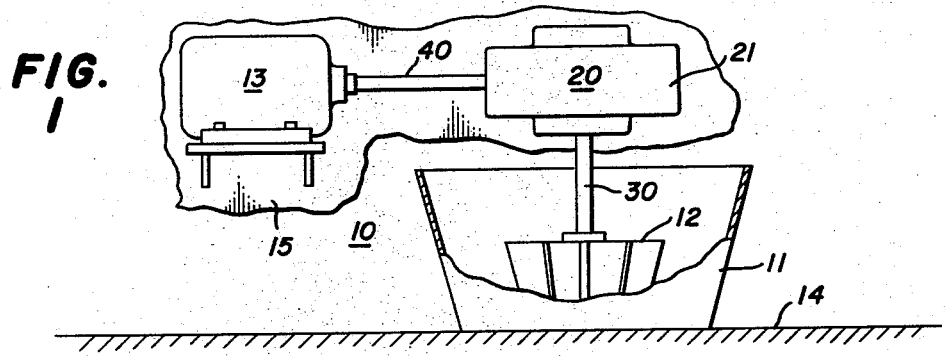
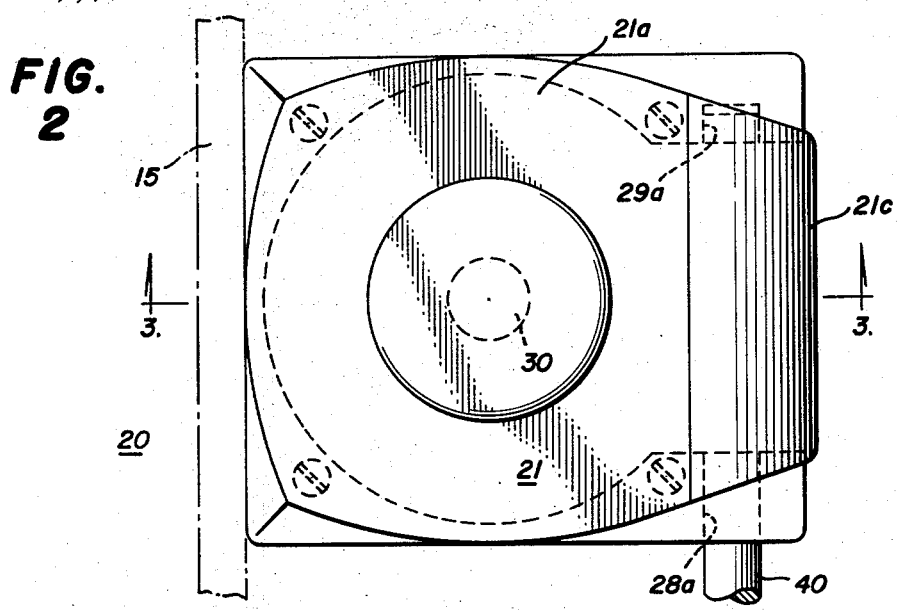
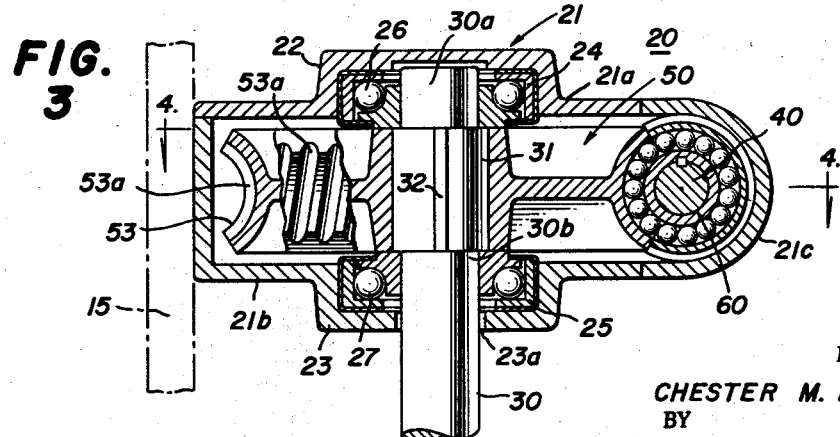
INVENTOR.
CHESTER M. MacCHESNEY
BY
ATTYS.

June 22, 1965  C. M. MacCHESNEY  3,190,138
MOTION TRANSMITTING MECHANISMS OF THE GEAR-PINION TYPE
Filed March 4, 1963  2 Sheets-Sheet 2
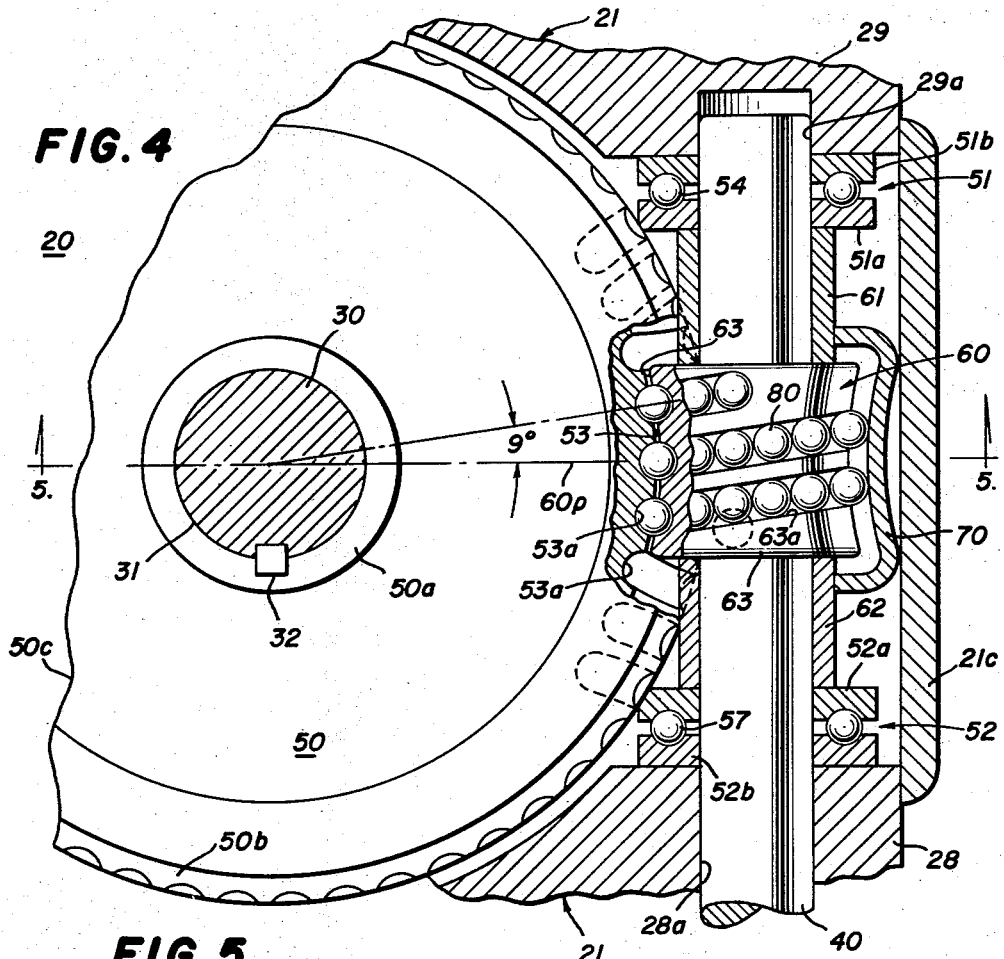
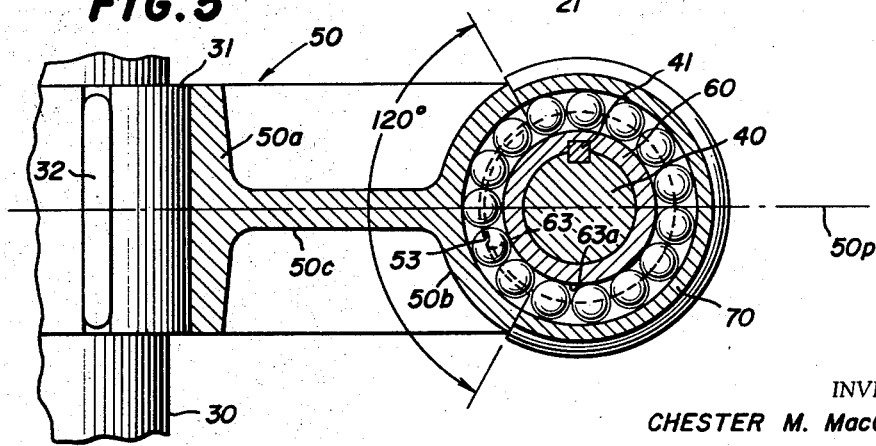
INVENTOR.
CHESTER M. MacCHESNEY
BY
Prangley, Baird, Clayton,
Miller & Vogel,
ATTYS.

United States Patent Office 3,190,138
Patented June 22, 1965

3,190,138
MOTION TRANSMITTING MECHANISMS OF THE GEAR-PINION TYPE
Chester M. MacChesney, Chicago, Ill., assignor of eighty-five percent to Ellamac Incorporated, Chicago, Ill., a corporation of Illinois, and fifteen percent to Clarence S. Henderson, Miami Beach, Fla.
Filed Mar. 4, 1963, Ser. No. 262,468
5 Claims. (Cl. 74—425)

The present invention relates to motion transmitting mechanisms of the gear-pinion type, and it is a general object of the invention to provide such a mechanism incorporating anti-friction structure substantially improving the efficiency of operation thereof.

Another object of the invention is to provide mechanism of the type noted, wherein the anti-friction structure mentioned consists essentially of a group of contiguous balls disposed in a helical groove provided in the pinion and cooperating with a plurality of helical slots provided in the gear, whereby rotation of the drive shaft rigidly secured to the pinion effects corresponding rotation of the driven shaft rigidly secured to the gear, and wherein the motion is transmitted from the pinion to the gear entirely by a subgroup of the balls disposed between the mutually facing outer surfaces of the pinion and the gear.

Another object of the invention is to provide mechanism of the character described, and further comprising an element supported in fixed position and in cooperating closely surrounding relation with the outer surface of the pinion disposed in non-facing relation with the outer surface of the gear, so as to retain in place in the groove in the pinion the subgroup of the balls disposed from between the mutually facing outer surfaces of the pinion and the gear.

A further object of the invention is to provide mechanism of the character described, and further comprising an enclosing casing for the gear and the pinion, first bearing members carried by the casing for supporting the driven shaft for rotation, and second bearing members carried by the casing for supporting the drive shaft for rotation, wherein the first bearing members are of the anti-friction type and arranged to minimize end-play of the driven shaft, and the second bearing members are of the anti-friction type and are arranged to minimize end-play of the drive shaft.

Further features of the invention pertain to the particular arrangement of the elements of the mechanism, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a fragmentary side elevational view of mixing or blending apparatus incorporating motion transmitting mechanism embodying the present invention;

FIG. 2 is an enlarged plan view of the enclosing casing for the mechanism, as shown in FIG. 1;

FIG. 3 is an enlarged vertical sectional view of the mechanism, this view being taken in the direction of the arrows along the line 3—3 in FIG. 2;

FIG. 4 is a greatly enlarged fragmentary horizontal sectional view of the mechanism, this view being taken in the direction of the arrows along the line 4—4 in FIG. 3; and FIG. 5 is a greatly enlarged fragmentary vertical sectional view of the mechanism, this view being taken in the direction of the arrows along the line 5—5 in FIG. 4.

Referring now to FIG. 1 of the drawings, there is illustrated diagrammatically mixing or blending apparatus 10 incorporating motion transmitting mechanism 20 embodying the features of the present invention. The apparatus 10 also comprises a container or vat 11 having an open top and adapted to receive the ingredients that are to be mixed or blended, as well as a beater 12 arranged in the container 11, and an electric drive motor 13 for operating the beater 12. In the arrangement, the container is carried upon a substantially horizontal floor 14, and the mechanism 20 and the electric motor 13 are suitably mounted upon an upstanding support 15. The mechanism 20 comprises an enclosing casing 21 in which a substantially vertically disposed driven shaft 30 is rotatably mounted and in which a substantially horizontally disposed drive shaft 40 is rotatably mounted, the lower end of the driven shaft 30 being operatively connected to the beater 12, and the outer end of the drive shaft 40 being operatively connected to the rotor, not shown, of the electric motor 13. Of course, the inner end of the drive shaft 40 is operatively connected to the upper end of the driven shaft 30 within the casing 21, as explained more fully below, whereby operation of the electric motor 13 effects rotation of the beater 12 through the elements 40, 20 and 30, with the result that the cooperating ingredients arranged in the container 11 are mixed or blended in an obvious manner. In the arrangement, the drive shaft 40 is rotated at a substantially higher speed than is the driven shaft 30 due to the speed reduction characteristic of the mechanism 20; and the drive shaft 40 may be reversible in order to cause corresponding reverse rotations of the driven shaft 30 in a well-known manner.

Referring now to FIGS. 2 to 5, inclusive, the motion transmitting mechanism 20 is of gear-pinion type; and the casing 21 comprises a number of coordinate sections 21a, 21b and 21c that may be securely fastened together by screws, or the like, not shown, so as completely to house the upper end portion of the driven shaft 30 and the inner end portion of the drive shaft 40. As best shown in FIG. 3, the upper casing section 21a comprises a substantially centrally disposed upwardly directed bell-like portion 22, and the lower casing section 21b comprises a substantially centrally disposed downwardly directed bell-like portion 23. The two bells 22 and 23 are arranged in vertically spaced-apart positions of alignment and respectively receive and support two bearing members 24 and 25 of the anti-friction type that, in turn, receive and support two bearing sections 30a and 30b respectively provided upon the driven shaft 30 and arranged in vertically spaced-apart relation along the longitudinal axis thereof, the two bearing sections 30a and 30b being separated by an enlargement 31 provided on the driven shaft 30. The bearing member 24 is of the thrust-ball type including an inner race frictionally secured to the adjacent bearing section 30a, an outer race frictionally secured in the bell 22, and a plurality of balls 26 arranged between the inner and outer races mentioned; and similarly, the bearing member 25 is of the thrust-ball type including an inner race frictionally secured to the adjacent bearing section 30b, an outer race frictionally secured in the bell 23, and a plurality of balls 27 arranged between the inner and outer races mentioned. Of course, the central portion of the bell 23 has an opening 23a therein, through which the adjacent portion of the driven shaft 30 projects. Finally, the enlargement 31 provided on the driven shaft 30 carries a disk-like gear 50 rigidly secured thereto by an associated spline 32. Thus the gear 50 is arranged between the bearing members 24 and 25 and housed within the casing 21. Accordingly, the driven shaft 30 is mounted by the bearing members 24 and 25 upon the casing 21 for rotation about its longitudinal axis extending in the vertical direction; which direction is hereinafter referred to as the Z direction of reference.

As best shown in FIG. 4, the front center portion of the lower casing section 21b comprises a pair of longitudinally spaced-apart bearing abutments 28 and 29 in which longitudinally aligned openings 28a and 29a are respectively arranged so as to receive and to support for rotation about its longitudinal axis the drive shaft 40. More particularly, the drive shaft 40 is mounted for rotation about its longitudinal axis extending in a horizontal position, hereinafter referred to as the X direction of reference, and also in a forwardly offset position with respect to the longitudinal axis of the driven shaft 30, hereinafter referred to as the Y direction of reference. The extreme inner end of the drive shaft 40 projects into the bearing opening 29a provided in the bearing abutment 29; and the drive shaft 40 is mounted for rotation about its longitudinal axis in the bearing openings 28a and 29a by an arrangement comprising a pair of longitudinally spaced-apart and aligned bearing members 51 and 52 of the antifriction type. More particularly, the bearing member 51 is of the thrust-ball type, including an inner race 51a frictionally secured to the adjacent surrounded portion of the drive shaft 40, an outer race 51b frictionally engaging the adjacent bearing abutment 29, and a plurality of balls 54 arranged between the inner and outer races 51a and 51b. Similarly, the bearing member 52 is of the thrust-ball type, including an inner race 52a frictionally secured to the adjacent surrounded portion of the drive shaft 40, an outer race 52b frictionally engaging the adjacent bearing abutment 28 and a plurality of balls 57 arranged between the inner and outer races 52a and 52b.

The intermediate portion of the drive shaft 40 disposed between the bearing members 51 and 52 carries a substantially drum-like pinion 60 rigidly secured thereto by an associated spline 41; and two sleeves 61 and 62 are disposed in surrounding relation with the two portions of the drive shaft 40 respectively disposed at the opposite ends of the pinion 60. Specifically, the sleeve 61 extends between one end of the pinion 60 and the adjacent side of the inner race 51a of the bearing member 51, and the sleeve 62 extends between the other end of the pinion 60 and the adjacent side of the inner race 52a of the bearing member 52; whereby the sleeves 61 and 62 hold the pinion 60 in fixed longitudinal position with respect to the bearing members 51 and 52. Of course, the outer end of the drive shaft 40 projects through the bearing opening 28a in the bearing abutment 28 to the exterior of the casing 21.

Recapitulating: the driven shaft 30 is mounted upon the casing 21 for rotation about its longitudinal axis extending in the Z direction of reference by the cooperating bearing members 24 and 25; and the drive shaft 40 is mounted upon the casing 21 for rotation about its longitudinal axis extending in the X direction of reference and offset from the longitudinal axis of the driven shaft 30 in the Y direction of reference by the cooperating bearing members 51 and 52. The bearing members 24 and 25 being of the thrust type minimize longitudinal end-play of the driven shaft 30 so as accurately to locate the gear 50 in the enclosing casing 21; and likewise, the bearing members 51 and 52 being of the thrust type minimize longitudinal end-play of the drive shaft 40, so as accurately to locate the pinion 60 in the enclosing casing 21. Also, of course, the pinion 60 rigidly carried by the drive shaft 40 is disposed in driving relation with the gear 50 rigidly carried by the driven shaft 40, as explained more fully below.

Turning now more particularly to FIGS. 3, 4 and 5, the gear 50 essentially comprises a centrally disposed substantially cylindrical hub 50a that is directly rigidly secured to the enlargement 31 provided upon the driven shaft 30 by the spline 32, as previously explained, as well as an outer substantially annular rim 50b and an interconnecting centrally positioned web 50c. The rim 50b includes an outer surface 53 of revolution generated about the longitudinal axis of the driven shaft 30 as a directrix and having a substantially concave cross section constituting a segment of a first circle at each intersection thereof with any radial plane passing through the longitudinal axis of the driven shaft 30, as clearly illustrated in FIG. 5. More specifically, as thus illustrated, the outer surface 53 subtends an angle of approximately 120° of the first circle mentioned. The pinion 60 includes an outer surface 63 of revolution generated about the longitudinal axis of the drive shaft 40 as a directrix and having a substantially concave cross section constituting a segment of a second circle at each intersection thereof with any radial plane passing through the longitudinal axis of the drive shaft 40, as clearly illustrated in FIG. 4. More specifically, as illustrated, the outer surface 63 subtends an angle of approximately 30° of the second circle mentioned.

The gear 50 and the pinion 60 are disposed in cooperating relation so that the median plane 50p of the gear 50 between the opposite faces thereof passes through the longitudinal axis of the drive shaft 40 (see FIG. 5), and so that the median plane 60p of the pinion 60 between the opposite ends thereof passes through the longitudinal axis of the drive shaft 30 (see FIG. 4), and so that in the median plane 60p of the pinion 60 of the first circle mentioned is centered along the longitudinal axis of the drive shaft 40 (see FIG. 5), and so that in the median plane 50p of the gear 50, the second circle is centered along the longitudinal axis of the driven shaft 30 (see FIG. 4), and so that the mutually facing segments of the outer surfaces 53 and 63 are disposed in closely spaced-apart relation (see FIGS. 4 and 5); whereby the gear 50 and the pinion 60 are arranged in mutually embracing relation, regardless of the rotary positions of the shafts 30 and 40. Specifically, as best illustrated in FIG. 5, the segment of the outer surface 53 of the gear 50 facing the outer surface 63 of the pinion 60 embraces the same in the vertical or median plane 60p of the pinion 60. Similarly, as best illustrated in FIG. 4, the segment of the outer surface 63 of the pinion 60 facing the outer surface 53 of the gear 50 embraces the same in the horizontal or median plane 50p of the gear 50.

Still referring to FIGS. 3, 4 and 5, the gear outer surface 53 has a plurality of circumferentially spaced-apart and helically disposed slots 53a therein; and the pinion outer surface 63 has an elongated substantially helical groove 63a of a plurality of longitudinally spaced-apart turns therein; wherein the slots 53a and the turns in the helical groove 63a have a fixed angular pitch measured from the longitudinal axis of the driven shaft 30 (see FIG. 4). The fixed angular pitch mentioned has a value depending upon the speed reduction that is to be effected between the drive shaft 40 and the driven shaft 30; which speed reduction has been selected as 40:1 for the purpose of the present example; whereby the fixed angular pitch mentioned comprises 9°. Accordingly, forty of the helical slots 53a are provided in the gear outer surface 53 and adjacent turns of the helical groove 63a provided in the pinion outer surface 63 are spaced by the pitch angle of 9° measured from the longitudinal axis of the driven shaft 30, as clearly illustrated in FIG. 4.

A substantially semi-cylindrical stationary element 70 is housed on the front central portion of the casing 21 and fixedly secured to the front casing section 21c; which stationary element 70 cooperates with the pinion 60 and partially surrounds the same in closely spaced-apart relation with the adjacent segment of the pinion outer surface 63 that is disposed in non-facing relation with the gear outer surface 53. Specifically, the stationary element 70 subtends an angle of approximately 240° and is centrally disposed about the longitudinal axis of the drive shaft 40, as clearly illustrated in FIG. 5.

Finally a group of contiguous balls 80 is disposed in the helical groove 63a provided in the pinion outer surface 63, so that a plurality of the balls 80 are arranged as a first subgroup mutually in the slots 53a and in the adjacent segments of the turns of the helical groove 63a and so that another plurality of the balls 80 are arranged as a second subgroup mutually in the turns of the helical groove 63a and in contact with the inner surface of the element 70. Thus, the balls 80 in the group mentioned are held in position in the turns of the helical groove 63a for rotation with the pinion 63 and for individual rotation in the turns noted, whereby rotation of the drive shaft 40 effects corresponding rotation of the driven shaft 30 by the action of the pinion 60 upon the gear 50 through the first subgroup of balls 80, noted above.

In the arrangement, each one of the helical slots 53a provided in the gear outer surface 53 is offset in the Z direction of reference between the opposite ends thereof at the respective opposite faces of the rim 53 of the gear 50 so that two radial planes commonly passing through the longitudinal axis of the driven shaft 30 and respectively extending substantially centrally through the opposite ends of the one slot 53a are displaced from each other by an angle somewhat less than ½ of the fixed angular pitch noted; in fact, the offset mentioned is equal to ⅓ of this angular pitch, or 3°, as will be clearly understood from an examination of FIGS. 4 and 5.

In view of the foregoing, it will be understood that the speed reduction between the drive shaft 40 and the driven shaft 30 is 40:1, so that each revolution of the drive shaft 40 effects rotation of the driven shaft 30 through an angle of 9°. Of course, it will be understood that the arragement of the mechanism 20 between the electric motor 13 and the beater 12 in the apparatus 10 of FIG. 1 accommodates a substantial speed reduction of 40:1 between the electric motor 13 and the beater 12, as explained above. Also, it will be understood that in the operation of the mechanism 20, the drive shaft 40 may be rotated in either direction by the electric motor 13, so as to effect corresponding reverse directions of rotation of the driven shaft 30. In other words, while the mechanism 20 must be operated to transmit motion from the drive shaft 40 to the driven shaft 30, the drive shaft 40 may be rotated in either direction in order to effect corresponding reversal of directions of rotation of the driven shaft 30.

In view of the foregoing, it will be understood that the arrangement of the balls 80 between the pinion 60 and the gear 50 greatly minimizes the friction therebetween, so as substantially to improve the efficiency of the motion transmitting mechanism 20 for the purpose of transmitting power from the drive shaft 40 to the driven shaft 30. Also to this end, it is mentioned that the balls 80 comprise steel balls having hardened outer surfaces constituting substantially perfect polished spheres; and furthermore, a suitable lubricating oil or grease is normally applied to the balls 80 and into the helical groove 63a formed in the pinion outer surface 63 and into the helical slots 53a formed in the gear outer surface 53. Of course, the bearing members 24, 25 and 51, 52 are suitably lubricated in order to minimize friction in the rotary motions of the driven shaft 30 and the drive shaft 40, respectively, in a conventional manner.

In view of the foregoing, it is apparent that there has been provided motion transmitting mechanism of the gear-pinion type incorporating improved anti-friction structure for effecting the transmission of the motion from the pinion to the gear so as substantially to improve the efficiency of operation of the mechanism.

While there has ben described what is at present considered to be the preferred embodiment of the invention, it will be understood that various modifications may be made therein, and it is intended to cover in the appended claims all such modifications as fall within the true spirit and scope of the invention.

What is claimed is:

1. Motion transmitting mechanism comprising a driven shaft mounted for rotation about its longitudinal axis extending in the Z direction of reference, a drive shaft mounted for rotation about its longitudinal axis extending in the X direction of reference and offset from the longitudinal axis of said driven shaft in the Y direction of reference, a disk-like gear rigidly secured to said driven shaft and including an outer surface of revolution generated about the longitudinal axis of said driven shaft as a directrix and having a substantially concave cross section constituting a segment of a first circle at each intersection thereof with any radial plane passing through the longitudinal axis of said driven shaft, a drum-like pinion rigidly secured to said drive shaft and including an outer surface of revolution generated about the longitudinal axis of said drive shaft as a directrix and having a substantially concave cross section constituting a segment of a second circle at each intersection thereof with any radial plane passing through the longitudinal axis of said drive shaft, said gear and said pinion being disposed in cooperating relation so that the median plane of said gear between the opposite faces thereof passes through the longitudinal axis of said drive shaft and so that the median plane of said pinion between the opposite ends thereof passes through the longitudinal axis of said driven shaft and so that in the median plane of said pinion said first circle is centered along the longitudinal axis of said drive shaft and so that in the median plane of said gear said second circle is centered along the longitudinal axis of said driven shaft and so that the mutually facing segments of said outer surfaces are disposed in closely spaced-apart relation, whereby said gear and said pinion are arranged in mutually embracing relation regardless of the rotary positions of said shafts, said gear outer surface having a plurality of circumferentially spaced-apart and helically disposed slots therein, said pinion outer surface having an elongated continuous substantially helical groove of a plurality of longitudinally spaced-apart interconnected turns therein, wherein said slots and said turns have a fixed angular pitch measured from the longitudinal axis of said driven shaft, a stationary element supported in fixed position and in cooperating relation with said pinion and partially surrounding in closely spaced-apart relation the adjacent segment of said pinion outer surface disposed in non-facing relation with said gear outer surface, and a group of contiguous balls disposed in said groove so that a plurality of said balls are arranged as a first subgroup mutually in said slots and in said turns and so that another plurality of said balls are arranged as a second subgroup mutually in said turns and in contact with said element, the balls in said group being held in position in said turns for rotation with said pinion and for individual rotation in said turns, whereby rotation of said drive shaft effects corresponding rotation of said driven shaft by the action of said pinion upon said gear through said first subgroup of balls, the opposite ends of said groove being closed by the respectively adjacent end portions of said pinion and said group of balls substantially completely filling said groove between the opposite closed ends thereof, thereby to restrain said balls against circulation or any substantial movement along the helix of said groove.

2. The motion transmitting mechanism set forth in claim 1, wherein each one of said slots is offset in the Z direction of reference between the opposite ends thereof at the respective opposite faces of said gear so that two radial planes commonly passing through the longitudinal axis of said driven shaft and respectively extending substantially centrally through the opposite ends of said one slot are displaced from each other by an angle somewhat less than one-half of said fixed angular pitch.

3. Motion transmitting mechanism comprising a casing, a driven shaft arranged in said casing and mounted thereupon for rotation about its longitudinal axis extending in the Z direction of reference, a drive shaft arranged in said casing and mounted thereupon for rotation about its longitudinal axis extending in the X direction of reference and offset from the longitudinal axis of said driven shaft in the Y direction of reference, a disk-like gear arranged in said casing and rigidly secured to said driven shaft and including an outer surface of revolution generated about the longitudinal axis of said driven shaft as a directrix and having a substantially concave cross section constituting a segment of a first circle at each intersection thereof with any radial plane passing through the longitudinal axis of said driven shaft, a drum-like pinion arranged in said casing and rigidly secured to said drive shaft and including an outer surface of revolution generated about the longitudinal axis of said drive shaft as a directrix and having a substantially concave cross section constituting a segment of a second circle at each intersection thereof with any radial plane passing through the longitudinal axis of said drive shaft, said gear and said pinion being disposed in cooperating relation so that the median plane of said gear between the opposite faces thereof passes through the longitudinal axis of said drive shaft and so that the median plane of said pinion between the opposite ends thereof passes through the longitudinal axis of said driven shaft and so that in the median plane of said pinion said first circle is centered along the longitudinal axis of said drive shaft and so that in the median plane of said gear said second circle is centered along the longitudinal axis of said driven shaft and so that the mutually facing segments of said outer surfaces are disposed in closely spaced-apart relation, whereby said gear and said pinion are arranged in mutually embracing relation regardless of the rotary positions of said shafts, said gear outer surface having a plurality of circumferentially spaced-apart and helically disposed slots therein, said pinion outer surface having an elongated continuous substantially helical groove of a plurality of longitudinally spaced-apart interconnected turns therein, wherein said slots and said turns have a fixed angular pitch measured from the longitudinal axis of said driven shaft, a stationary element arranged in said casing and supported thereby in cooperating relation with said pinion and partially surrounding in closely spaced-apart relation the adjacent segment of said pinion outer surface disposed in non-facing relation with said gear outer surface, and a group of contiguous balls disposed in said goove so that a plurality of said balls are arranged as a first subgroup mutually in said slots and in said turns and so that another plurality of said balls are arranged as a second subgroup mutually in said turns and in contact with said element, the balls in said group being held in position in said turns for rotation with said pinion and for individual rotation in said turns, whereby rotation of said drive shaft by the action of said pinion upon said gear through said first subgroup of balls, the opposite ends of said groove being closed by the respectively adjacent end portions of said pinion and said group of balls substantially completely filling said groove between the opposite closed ends thereof, thereby to restrain said balls against circulation or any substantial movement along the helix of said groove.

4. Motion transmitting mechanism comprising a casing, a driven shaft arranged in said casing, means including a pair of first bearing members carried by said casing for mounting said driven shaft therein for rotation about its longitudinal axis extending in the X direction of reference, said first bearing members being arranged in spaced-apart relation along the longitudinal axis of said driven shaft, a drive shaft arranged in said casing, means including a pair of second bearing members carried by said casing for mounting said drive shaft therein for rotation about its longitudinal axis extending in the X direction of reference and offset from the longitudinal axis of said driven shaft in the Y direction of reference, said second bearing members being arranged in spaced-apart relation along the longitudinal axis of said drive shaft, a disk-like gear arranged in said casing and rigidly secured to said driven shaft intermediate said first bearing members, said gear including an outer surface of revolution generated about the longitudinal axis of said driven shaft as a directrix and having a substantially concave cross section constituting a segment of a first circle at each intersection thereof with any radial plane passing through the longitudinal axis of said driven shaft, a drum-like pinion arranged in said casing and rigidly secured to said drive shaft intermedite said second bearing members, said pinion including an outer surface of revolution generated about the longitudinal axis of said drive shaft as a directrix and having a substantially concave cross section constituting a segment of a second circle at each intersection thereof with any radial plane passing through the longitudinal axis of said drive shaft, said gear and said pinion being disposed in cooperating relation so that the median plane of said gear between the opposite faces thereof passes through the longitudinal axis of said drive shaft and so that the median plane of said pinion between the opposite ends thereof passes through the longitudinal axis of said driven shaft and so that in the median plane of said pinion said first circle is centered along the longitudinal axis of said drive shaft and so that in the median plane of said gear said second circle is centered along the longitudinal axis of said driven shaft and so that the mutually facing segments of said outer surfaces are disposed in closely spaced-apart relation, whereby said gear and said pinion are arranged in mutually embracing relation regardless of the rotary positions of said shafts, said gear outer surface having a plurality of circumferentially spaced-apart and helically disposed slots therein, said pinion outer surface having an elongated continuous substantially helical groove of a plurality of longitudinally spaced-apart interconnected turns therein, wherein said slots and said turns have a fixed angular pitch measured from the longitudinal axis of said driven shaft, a stationary element arranged in said casing and supported thereby in cooperating relation with said pinion and partially surrounding in closely spaced-apart relation the adjacent segment of said pinion outer surface disposed in non-facing relation with said gear outer surface, and a group of contiguous balls disposed in said groove so that a plurality of said balls are arranged as a first subgroup mutually in said slots and in said turns and so that another plurality of said balls are arranged as a second subgroup mutually in said turns and in contact with said element, the balls in said group being held in position in said turns for rotation with said pinion and for individual rotation in said turns, whereby rotation of said drive shaft effects corresponding rotation of said driven shaft by the action of said pinion upon said gear through said first subgroup of balls, the opposite ends of said groove being closed by the respectively adjacent end portions of said pinion and said group of balls substantially completely filling said groove between the opposite closed ends thereof, thereby to restrain said balls against circulation or any substantial movement along the helix of said groove.

5. The motion transmitting mechanism set forth in claim 4, wherein said first bearing members are of the anti-friction type and are arranged to minimize longitudinal end-play of said driven shaft, and said second bearing members are of the anti-friction type and are arranged to minimize longitudinal end-play of said drive shaft.

References Cited by the Examiner
UNITED STATES PATENTS

| | | | |
|---|---|---|---|
| 2,403,096 | 7/46 | Slavic | 74—458 |
| 2,451,998 | 10/48 | Wahlberg et al. | 74—458 |
| 2,520,784 | 8/50 | Schlicksupp | 74—458 |
| 2,664,760 | 1/54 | Booth | 74—458 |
| 2,673,473 | 3/54 | Phelps | 74—458 |

DON A. WAITE, *Primary Examiner.*